(12) United States Patent
Fischer

(10) Patent No.: US 9,994,241 B2
(45) Date of Patent: Jun. 12, 2018

(54) RAIL VEHICLE

(71) Applicant: SIEMENS AKTIENGESELLSCHAFT, Munich (DE)

(72) Inventor: Harald Fischer, Fuerth (DE)

(73) Assignee: Siemens Aktiengesellschaft, Munich (DE)

(*) Notice: Subject to any disclaimer, the term of this patent is extended or adjusted under 35 U.S.C. 154(b) by 0 days. days.

(21) Appl. No.: 15/328,148

(22) PCT Filed: Jul. 16, 2015

(86) PCT No.: PCT/EP2015/066253
§ 371 (c)(1),
(2) Date: Jan. 23, 2017

(87) PCT Pub. No.: WO2016/012335
PCT Pub. Date: Jan. 28, 2016

(65) Prior Publication Data
US 2017/0217457 A1 Aug. 3, 2017

(30) Foreign Application Priority Data
Jul. 22, 2014 (DE) .................. 10 2014 214 228

(51) Int. Cl.
B61L 15/00 (2006.01)
G06F 13/40 (2006.01)
(Continued)

(52) U.S. Cl.
CPC ....... *B61L 15/0036* (2013.01); *B61L 15/0063* (2013.01); *B61L 15/0072* (2013.01);
(Continued)

(58) Field of Classification Search
CPC ............ B61L 15/0036; B61L 15/0063; B61L 15/0072; B61L 15/0081; B61L 2201/00;
(Continued)

(56) References Cited

U.S. PATENT DOCUMENTS 4,208,717 A 6/1980 Rush
4,835,693 A 5/1989 Smith et al.
(Continued)

FOREIGN PATENT DOCUMENTS

CN 102514576 A 6/2012
DE 102012206316 A1 10/2013
(Continued)

*Primary Examiner* — Tyler J Lee
(74) *Attorney, Agent, or Firm* — Laurence Greenberg; Werner Stemer; Ralph Locher

(57) ABSTRACT

A rail vehicle includes a vehicle unit having operating device subsystems and a guide system including a first guide system level in which operating device subsystems are networked with one another by using a digital data bus structure, and at least one second guide system level having at least one line set associated with the analog handling of processes in the operating device subsystems. In order to provide a generic rail vehicle in which a high level of safety can be achieved with little outlay on wiring, the vehicle unit includes a guide system interface device having a first interface unit associated with the data bus structure, at least one second interface unit associated with the line set, and a control unit which, in at least one operating mode, is provided for handling the processes through the second interface unit.

20 Claims, 5 Drawing Sheets

(51) Int. Cl.
*H04L 12/40* (2006.01)
*H04B 3/54* (2006.01)

(52) U.S. Cl.
CPC ...... *B61L 15/0081* (2013.01); *G06F 13/4027* (2013.01); *G06F 13/4068* (2013.01); *H04L 12/40* (2013.01); *B61L 2201/00* (2013.01); *H04B 3/542* (2013.01); *H04L 2012/40293* (2013.01)

(58) Field of Classification Search
CPC . G06F 13/4027; G06F 13/4068; H04B 3/542; H04L 12/40; H04L 2012/40293
USPC .......................................................... 701/19
See application file for complete search history.

(56) References Cited

U.S. PATENT DOCUMENTS

| | | | |
|---|---|---|---|
| 6,669,308 B1 * | 12/2003 | Aurich | B60T 8/1893 303/15 |
| 2012/0317282 A1 | 12/2012 | Kraeling et al. | |
| 2014/0277862 A1 * | 9/2014 | Pritchard | B61C 17/12 701/19 |
| 2015/0277390 A1 * | 10/2015 | Knox | G05B 23/0256 700/12 |

FOREIGN PATENT DOCUMENTS

| | | |
|---|---|---|
| EP | 2487803 A1 | 8/2012 |
| RU | 2254256 C1 | 6/2005 |

* cited by examiner

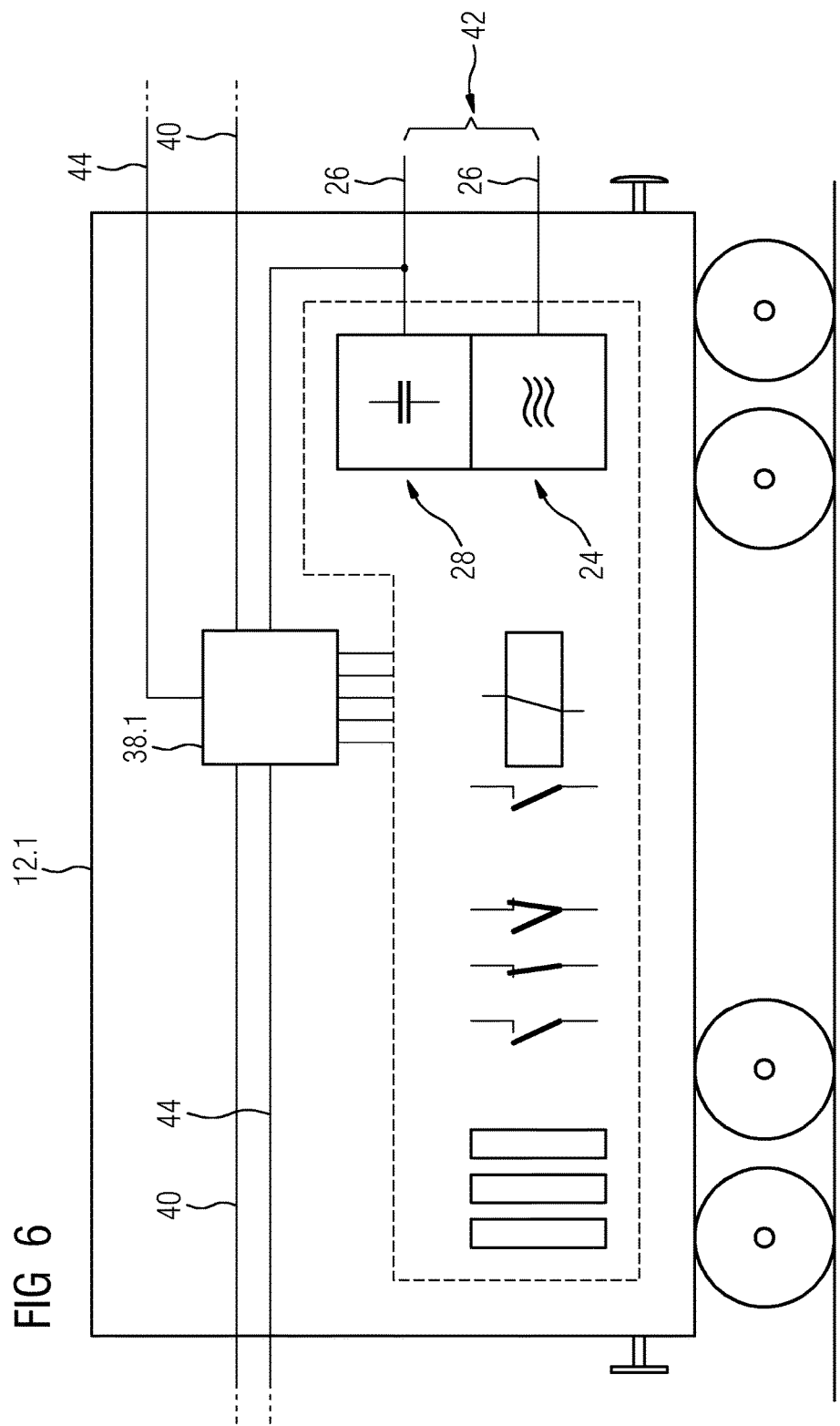

RAIL VEHICLE

BACKGROUND OF THE INVENTION

Field of the Invention

The invention relates to a rail vehicle having a vehicle unit which has operating means subsystems and having a guide system comprising a first guide system level, in which operating means subsystems are networked with one another by means of a digital data bus structure, and at least one second guide system level which has at least one line set assigned to the analog handling of processes in operating means subsystems.

Rail vehicles, in particular multiple unit trainsets, are known which are equipped with a digital control and communication guidance system. For this purpose, subsystems of the rail vehicle are networked with one another by means of a digital data bus structure which forms a first guide system level. For example, control devices such as a drive control device and a brake control device are connected to a bus system via which they are able to communicate with one another and with further operating means—e.g. elements of a sensor system. Independently of said guide system level, a multiplicity of safety-relevant auxiliary connections are required in order to satisfy requirements in accordance with CSM ("Common Safety Methods"). Said auxiliary connections typically take the form of electrical loops, known to experts in the field as "safety loops". Examples thereof are door control loops, emergency brake loops, coupling loops, door locking loops, brake command loops, etc. An expensive and complex conventional switching system is necessary in order to monitor and evaluate the electrical signals conducted by said loops. Such a system is based on the use of a multiplicity of switches conforming to relay technology, with which a high wiring overhead is associated. For example, it is desired to be able to determine with sufficient certainty by means of conventional switching elements whether an emergency brake cord has been pulled or a door is still open or has already been locked. Checking a door opening process as a function of the direction of travel is likewise accomplished by means of the control of conventional switching elements.

The cabling schemes, cable feedthroughs and interconnect systems necessary for this require a large installation space for assembly and must be implemented using long-lived connection elements (e.g. gold and silver contacts). In terms of a modular structure affording expansion possibilities, these solutions are subject to severe limitations in respect of manageability.

Furthermore, the use of existing bus systems of a digital control and communication guidance system is not without restrictions. The computer-based hardware present in existing vehicles is not able to achieve a high level of safety integrity (or "SIL level") in every respect.

BRIEF SUMMARY OF THE INVENTION

The object underlying the invention is to provide a rail vehicle in which a high level of safety can be achieved with a low wiring overhead.

To that end, it is proposed that the vehicle unit comprise a guide system interface device which has a first interface unit assigned to the data bus structure, at least one second interface unit assigned to the line set, and a control unit which in at least one operating mode is provided for handling the processes by way of the second interface unit. This advantageously enables savings to be made on conventional switching, monitoring and evaluation elements for handling the processes. The wiring of the vehicle unit can be considerably simplified as a result.

What is to be understood by an "operating means subsystem" is at least one operating resource or a set of operating resources which is or are assigned to a common task in the operation of the rail vehicle. If an operating means subsystem has a plurality of operating means, these are provided in order to perform at least said task in cooperation. In addition to the operating means in question, the operating means subsystem beneficially comprises a local networking of the operating means with one another. Typical operating means subsystems are embodied as a drive unit, braking device, door device, air conditioning device, passenger information device, emergency braking device, etc.

What is to be understood by a "handling" of a process is in particular at least a controlling, for example a triggering, a monitoring and/or an evaluation of the process. What is to be understood by an "analog handling" is a handling which is performed at least using analog means. Analog means are in particular analog lines which are beneficially configured for carrying an analog electrical signal, and means which are connected to at least one analog line, in particular directly connected physically. Typical means are in particular actuating means, such as e.g. pushbutton switches, levers, etc., and switching means.

The line set is in this case beneficially formed by analog lines. These are different from lines of the data bus structure, which are configured for transmitting information in digital form. Accordingly, the first interface unit and the second interface unit are different from one another. The first interface unit forms interfaces for the digital data bus structure and has digital connection means for connecting cables for digital transmission purposes, while the second interface unit has interfaces for lines of the line set and has analog connection means which are configured for connecting analog electric cables. The first interface unit is embodied in particular as a digital input and output unit (or digital I/O unit), whereas the second interface unit is implemented as an analog input and output unit (or analog I/O unit). The latter serves in particular for coupling an electrical signal having at least one specific characteristic—in particular a specific voltage value, a specific current value, a specific frequency, etc.—into a line of the line set and for capturing or reading out a signal of said type from a line of the line set.

In an analog handling of processes, which is carried out by the control unit "by way of" the second interface unit, signals of a digital operating process of the control unit—in particular of at least one processor unit of the same—are beneficially converted as a handling of analog electrical signals of the line set—comprising in particular a coupling-in and a reading out—in cooperation with the second interface unit.

The guide system interface device is advantageously implemented as a hierarchical structure by means of the functional separation of the interface units, which are each assigned to a different guide system level.

Known technologies may be employed for the digital data bus structure. Thanks to a simple communications structure, the guide system interface device may in particular be connected to an existing digital control and communication guidance system, thereby enabling a simple retrofitting of existing rail vehicles to be achieved. A known control and communication guidance system is based in particular on Ethernet technology. In particular, a bus of the "Profinet®" type may be used as part of the data bus structure, in which case the bus topology may have a Profinet ring, for example. However, other structures, having e.g. a CAN bus, are conceivable.

In a particularly advantageous embodiment of the invention, the interface units and the control unit are arranged in an integrated housing unit of the guide system interface device.

The vehicle unit may be embodied as an individual rail car for the transportation of passengers, as a locomotive, as a lead power unit of a multiple unit trainset, as a driveless railway passenger car or as a car of a multiple unit trainset consisting of a formation of cars. In the case of a multiple unit trainset, a vehicle unit may furthermore be a grouping of cars which for control-related purposes forms an autonomous entity. Such a grouping is also referred to by experts in the field as a "consist". A consist may correspond to half of a multiple unit trainset, for example.

By means of the invention it is particularly advantageously possible to replace a system based on conventional switching technology by a corresponding technical implementation of the control unit in software. This enables an advantageous modularity to be achieved, in particular with a view to an extension of functionality.

In a preferred embodiment of the invention it is proposed that the control unit and the line set form at least one at least partially logical safety loop. It is well-known that a safety loop is assigned to the monitoring of safety-related processes in the rail vehicle. A safety loop is conventionally formed by an electrical analog line in which switching circuitry is arranged which is able to close or interrupt the loop as a function of an operational event. Typical examples of this are a door control loop, a door locking loop, an emergency brake loop, a brake command loop, a direction-of-travel determination loop, and/or a coupling loop. Thanks to the invention, routinely used conventional monitoring and evaluation means associated with a safety loop—such as in particular comparators, AND gates, OR gates, timers, etc.—can be replaced by software-based measures implemented in the control unit which fulfill, in particular simulate, the function of said conventional elements.

It is furthermore proposed that the guide system interface device have at least one third interface unit which is provided for connecting to at least two train buses. This enables an advantageous simplification of a wiring scheme between two coupled vehicle units to be achieved, since a communication between the vehicle units—including a data communication in respect of the processes handled by way of the second interface unit—can take place exclusively via the train buses. If, as proposed above, the control unit and the line set form at least one at least partially logical safety loop, a data communication via the train buses can comprise the transmission of safety-related information pertaining to the safety loop. An expensive and complex wiring scheme, separate from the train buses, for the purpose of establishing a physical safety loop comprising the coupled vehicle units can be avoided as a result.

What is to be understood by a "train bus" is in particular a data bus which is provided for a data communication between coupled vehicle units. Examples of a train bus conforming to the TCN standard are the WTB bus ("Wire Train Bus") and the ETB bus ("Ethernet Train Bus").

A particularly simple architecture of the guide system interface device can be realized if the guide system interface device has at least one internal data bus to which the control unit and the interface units are connected. Expansion options affording a high degree of modularity can be achieved as a result.

The invention further relates to a rail vehicle comprising a consist of vehicle units, each of which has operating means subsystems, and a guide system which has a first guide system level, in which operating means subsystems are networked with one another by means of a digital data bus structure, and at least one second guide system level which comprises at least one line set assigned to the analog handling of processes in operating means subsystems, wherein the guide system has a third guide system level comprising at least two train buses which connect the vehicle units to one another.

It is proposed that the guide system comprise a set of guide system interface devices, each of which is arranged in a different vehicle unit, and a first interface unit assigned to the data bus structure, a second interface unit assigned to the line set, at least one third interface unit for the train buses, and a control unit which in at least one operating mode is provided for handling the processes by way of the second interface unit. This advantageously enables savings to be made on conventional switching, monitoring and evaluation elements for handling the processes. The wiring of the vehicle unit can be considerably simplified as a result. The wiring of the vehicle units can be considerably simplified as a result. Furthermore, an advantageous simplification of a wiring scheme between the coupled vehicle units can be achieved, since a communication between the vehicle units—including a data communication in respect of the processes handled by way of the second interface unit—can take place exclusively via the train buses. A wiring scheme in the transition zone between two coupled vehicle units can be restricted to lines for the train buses and the electrical supply. An additional wiring arrangement, in particular with regard to satisfying safety requirements in accordance with CSM ("Common Safety Methods"), can advantageously be dispensed with. This enables a considerable cost saving to be achieved in terms of the wiring and in the use of plugs, connectors, cable ducts, etc. What is more, an advantageous reduction in weight can be achieved, and corrosion damage, cable breaks and the service costs associated therewith for the operator can be reduced.

Furthermore, the proposed architecture permits every single vehicle unit to be constructed as a self-contained entity or as a self-contained subsystem from the viewpoint of the control and communication guidance system. This enables the availability of the rail vehicle to be significantly increased compared to known solutions, since, depending on the situation, a control and communication malfunction in a vehicle unit is no obstacle to a continued operation of the rail vehicle. Advantageously, the guide system interface devices in each case form coupling points in each vehicle unit for connecting the first and second guide system levels to the third guide system level and its train buses, such that the function of a gateway can beneficially be assigned to them.

The rail vehicle may be embodied in particular as a multiple unit trainset, in which case the vehicle units are each embodied as cars provided for the transportation of passengers. In this arrangement, at least one car is equipped with a drive unit. The rail vehicle may furthermore be embodied as a consist composed of a plurality of multiple unit trainsets. The rail vehicle may also be embodied as a locomotive-hauled train, wherein at least one vehicle unit is embodied as a locomotive and remaining vehicle units are embodied as railway passenger cars for transporting passengers. Furthermore, each of the vehicle units may be embodied as a locomotive, the rail vehicle in that case corresponding to a consist of locomotives in multiple unit operation.

The invention particularly advantageously enables conventional switching technology to be replaced by a corresponding software-based implementation of the control unit. An advantageous modularity, in particular in terms of an expansion of functionality, can be achieved as a result.

In a preferred embodiment of the invention it is proposed that the control unit and the line set form at least one at least partially logical safety loop. It is well-known that a safety loop is assigned to the monitoring of safety-related processes in the rail vehicle. Conventionally, a safety loop is formed by an electrical analog line in which switching circuitry is arranged which is able to close or interrupt the loop as a function of an operational event. Typical examples of this are a door control loop, a door locking loop, an emergency brake loop, a brake command loop, a direction-of-travel determination loop, and/or a coupling loop. Thanks to the invention, routinely used conventional monitoring and evaluation means associated with a safety loop—such as in particular comparators, AND gates, OR gates, timers, etc.— can be replaced by software-based measures implemented in the control unit which fulfill, in particular simulate, the function of said conventional elements. By virtue of the proposed system architecture, a data communication via the train buses may comprise the transmission of safety-related information in respect of the at least one safety loop. An expensive and complex wiring scheme, separate from the train buses, for the purpose of establishing a physical safety loop comprising the coupled vehicle units, in particular a consist-wide physical safety loop, can be avoided as a result.

A particularly simple architecture of the guide system interface device can be achieved if each of the guide system interface devices has at least one internal data bus to which the control unit and the interface units are connected. Expansion options affording a high degree of modularity can be achieved as a result.

In a preferred embodiment of the invention it is proposed that at least one of the train buses be embodied as an Ethernet train bus. This enables reliable standard networking components to be used. Furthermore, an existing control and communication guidance system equipped with an Ethernet train bus can easily be retrofitted.

According to an advantageous development of the invention, it is proposed that the rail vehicle have an electrical power supply system, wherein one of the train buses is formed by lines of the power supply system. This enables a train bus to be provided in a constructionally simple manner—in particular as far as possible without additional wiring—in order to realize consist-wide data transmission.

An advantageous redundancy can furthermore be achieved if the third guide system level has at least three train buses, each of which connects the vehicle units to one another, wherein the third interface unit is provided for connecting to the at least three train buses. In this connection it is proposed that in one operating mode the control units in the guide system interface devices are in each case provided in order to determine and perform a distribution of data traffic to the train buses. This is advantageously enables an automatic configuration of the network spanned by the train buses to be achieved. This offers an increased modularity in respect of configuration changes. In particular, the control units can in each case form network nodes of a meshed network.

In a further embodiment variant of the invention, it is proposed that the train buses be assigned in each case to different safety levels. The safety levels are associated in particular with different safety standards. In particular, a first safety level may be assigned on the one hand to requirements relating to "security", while a second safety level is assigned to requirements relating to "safety". By "safety requirements" are to be understood in particular requirements that are defined in the standards EN 50128, 50159, 50126, 50129 and/or 61508. The safety requirements are aimed in particular at personal safety, while the security requirements are associated with general data security. Accordingly, the safety requirements are more stringent than the security requirements.

In this connection it is proposed that one of the train buses be embodied as a convenience bus which is provided at least for the purpose of transmitting information for the passengers. A particularly advantageous differentiated handling of a communication of convenience functions and safety-related functions can furthermore be achieved if one of the train buses that is different from the convenience bus serves for transmitting drive or braking data.

BRIEF DESCRIPTION OF THE SEVERAL VIEWS OF THE DRAWING

An exemplary embodiment of the invention is explained with reference to the drawings, in which:

FIG. 6: shows the lead car of the rail vehicle from FIG. 1.

DESCRIPTION OF THE INVENTION

Figure 1:
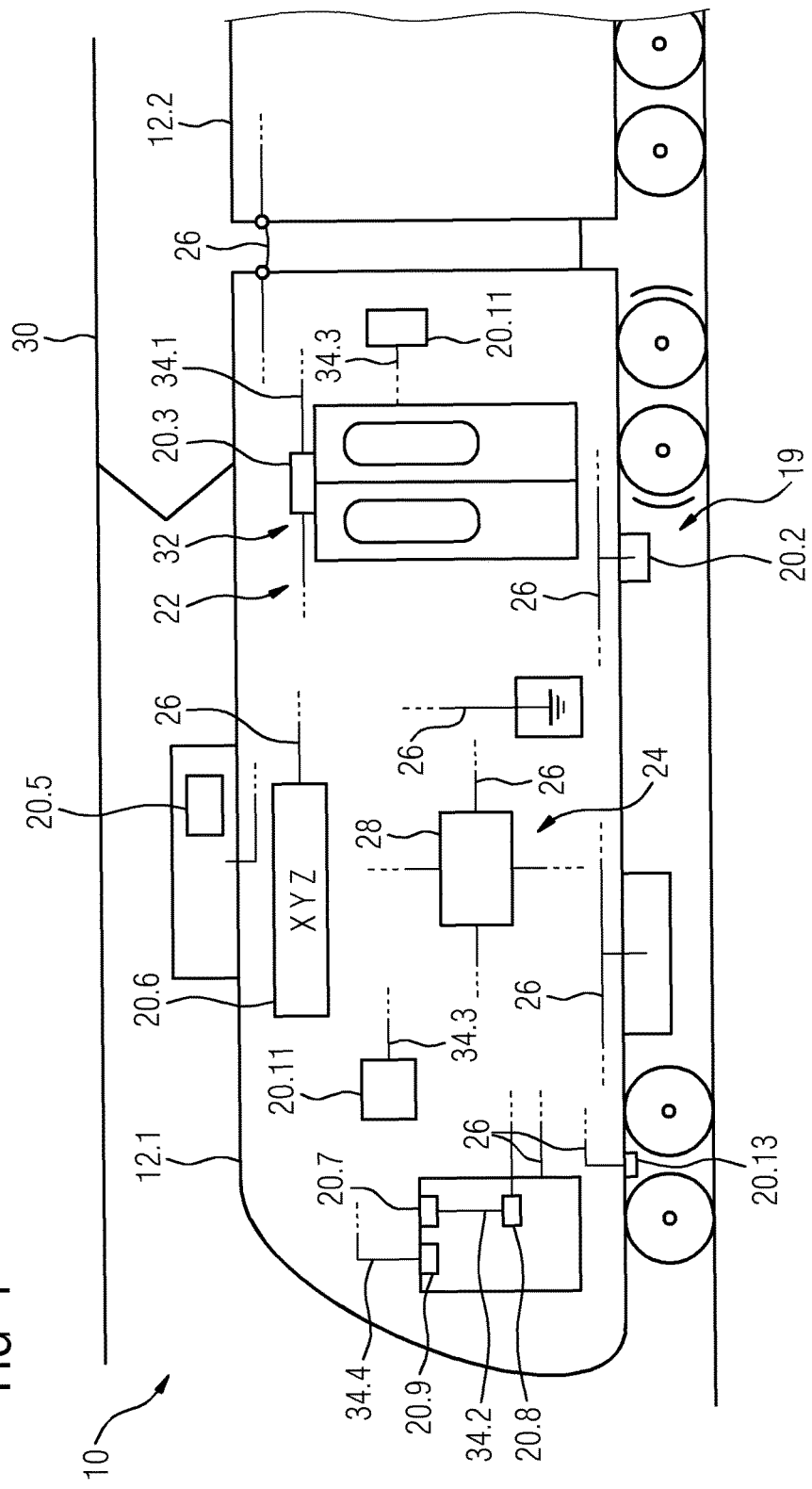
FIG. 1: shows a rail vehicle with operating means in a schematic side view.

FIG. 1 shows a rail vehicle 10 in a schematic side view. The rail vehicle 10 is embodied as a consist composed of a plurality of vehicle units 12.1, 12.2, etc., each embodied as a car for transporting passengers, which are mechanically coupled to one another and form a multiple unit trainset. For that purpose, at least one of the vehicle units of the consist is provided with a drive unit 14 for driving at least one driving axle 16 (see FIG. 2). In a further embodiment it is conceivable that the rail vehicle 10 is embodied as a single rail car. The rail vehicle 10 may additionally have a consist of driveless railway passenger cars which is coupled to at least one traction vehicle, e.g. a locomotive.

It is common knowledge that the rail vehicle 10 has a number of operating means which enable an operation of the rail vehicle 10. These may be embodied in particular as a control unit, sensor unit and/or actuator unit. The operating means which are installed in the rail vehicle 10, and which are therefore permanently tied to the vehicle structure, are networked with one another for communication and control purposes by means of a guide system 18 which is shown in more detail in FIGS. 2 to 6.

The operating means 20 shown by way of example in FIG. 1 are embodied as operating means 20.2 of a braking device 19, operating means 20.3 of a door device, operating means 20.5 of an air conditioning unit, operating means 20.6 of a passenger information system, operating means 20.7, 20.8 and 20.9 of a human-machine interface for the traction vehicle driver, operating means 20.11 of an emergency braking device, and operating means 20.13 of a train control system.

It is known that the rail vehicle 10 has an electrical system 22 which comprises a set of electrical lines to which the operating means 20 are connected. The electrical system 22 comprises an electrical supply system 24 which serves to supply the operating means 20 as electrical power-consuming load with electrical energy. To that end, the supply system 24 has a set of electrical lines 26 which connect the operating means 20 to an energy supply 28 for energy transmission purposes in such a way that a flow of energy can be established between the energy supply 28 and the individual operating means 20. In addition to electrical conductors which carry at least one current phase, the set of electrical lines 26 includes in particular also so-called ground leads which carry a reference potential—the ground potential or the vehicle potential. The energy supply 28 shown schematically in FIG. 1 may correspond in particular to an intermediate voltage circuit which itself is fed with energy from a power supply 30 by means of an input circuit (not shown in more detail) of the rail vehicle 10. An electrical signal adapted for the operation of the associated electrical load is generated from the energy of the intermediate voltage circuit by means of at least one current converter of the supply system 24 and conducted by means of electrical lines 26 to said load. Depending on the load groups to be supplied, the lines 26 carry electric currents that have different characteristics (direct-current voltage, alternating-current voltage, voltage value, frequency value, number of current phases, etc.). For clarity of illustration reasons, the lines 26 are represented schematically in FIG. 1, a complete illustration of the networking of the lines 26 being dispensed with.

The electrical system 22 also has a set 32 of electrical lines 34. This is assigned to the analog handling of processes by means of analog voltage and/or current signals. Examples of such analog processes are described below.

For example, the line set 32 has a first group of electrical lines 34.1 which connect the operating means 20.3 embodied in each case as a door drive for actuating a door opening or door closing function in the depicted vehicle unit 12.1 to one another. In known solutions (not shown here), the lines 34.1 conventionally extend along the entire consist, connecting all of the door drives of the consist to one another and to an evaluation unit.

In addition, the line set 32 comprises a further group of electrical lines 34.2 which is assigned to the so-called "dead man's vigilance device" of the rail vehicle 10. As is generally known, the operating means 20.7 (hand actuation) and 20.8 (foot actuation) embodied as actuating units are connected to said device. In known solutions (not shown here), an operating means equipped with timers and embodied as a monitoring unit and an operating means embodied as a recording device (also known as a "juristical recorder") are conventionally connected to the electrical lines 34.2.

Also shown are electrical lines 34.3 of the line set 32, which are assigned to the emergency braking function of the rail vehicle 10. These connect the operating means 20.11 embodied as an emergency brake actuator in the depicted vehicle unit 12.1. As is generally known, the electrical lines 34.3 conduct a constant direct-current voltage. In known solutions (not shown here), the lines 34.3 of the emergency braking function conventionally extend along the entire consist and connect all of the emergency brake actuators of the consist to one another and to a monitoring unit, which itself is operatively connected to a braking controller of the braking device 19.

The line set 32 additionally comprises a further group of lines 34.4 which are assigned to the emergency brake override function. Connected to said group of lines is the operating means 20.9 of the human-machine interface embodied as an actuating unit for the vehicle driver. In known solutions (not shown here), said operating means is conventionally connected to an evaluation unit, which is itself operatively connected for control purposes to a braking controller of the braking device 19.

The above-described groups of electrical lines 34.1 to 34.4 are conventionally parts of loops, also referred to by experts in the field as "safety loops". In the example of the lines 34.1, such lines connect switches integrated in the door drives, each of which conducts a constant voltage injected into the loop onward when the associated door is closed. The further functions assigned to the lines 34.2 to 34.4 are likewise based on the principle of a switch which closes or interrupts a voltage loop, the injection and the readout of the corresponding voltage signal being realized in the known solutions by means of input and output modules which conventionally are different in each case for the above-described functions. This is because the above-described groups of lines of the line set 32 conventionally belong to mutually independent safety-related systems which require their own, where necessary consist-wide, wiring.

Figure 2:
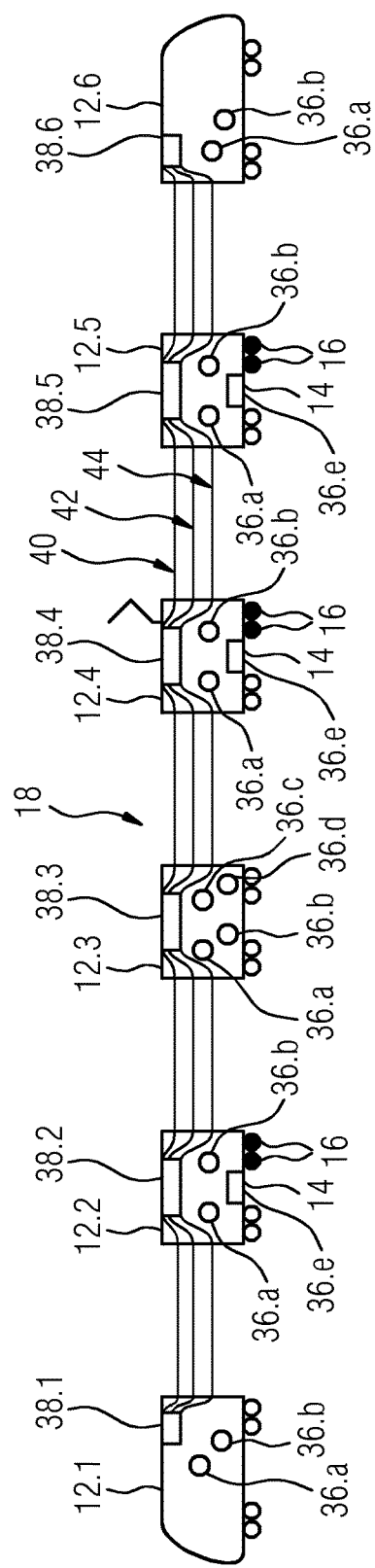
FIG. 2: shows the rail vehicle from FIG. 1 with a guide system comprising three train buses and guide system interface devices in each car.

FIG. 2 shows the full consist of vehicle units 12.1 to 12.6 in a schematic side view. Operating means 20 of the rail vehicle 10, some examples of which are shown in FIG. 1, are arranged distributed over the entire consist. Certain operating means 20, in particular those that are constituent parts of a drive unit 14 or a human-machine interface for the vehicle driver, are not present in every vehicle unit 12. A drive unit 14, by means of which driving axles 16 may be driven, is arranged in each of the vehicle units 12.2, 12.3 and 12.5, while the remaining vehicle units 12.1, 12.3 and 12.6 are driveless. Further operating means 20, such as e.g. components of the passenger information system, are present in each vehicle unit 12 of the consist. For clarity of illustration reasons, individual operating means 20 are not shown in FIG. 2.

Operating means 20 which are assigned to a common function in the rail vehicle 10, in particular are provided to work in cooperation in order to complete a specific task, are handled in terms of their control as a group of operating means, which is referred to by experts in the field as an "operating means subsystem" and is assigned to the task. Examples of subsystems which are assigned to a vehicle unit 12 are a "drive unit", "braking unit", "door device", "air conditioning device", "passenger information device", "emergency braking device", etc. The subsystems are represented schematically in FIG. 2 and respectively labeled with the reference signs 36.a, 36.b, etc. The drive units 14 in the corresponding vehicle units are likewise considered in each case as a subsystem 36.e.

FIG. 2 also shows the guide system 18 of the rail vehicle 10. Said guide system has a set of guide system interface devices 38.1, 38.2, etc., each of which is arranged in a different vehicle unit 12.1, 12.2, etc. The guide system interface devices 38 each have interface units, shown in more detail in FIGS. 3 and 4, to which the subsystems 36 of the corresponding vehicle unit 12 are connected. The guide system interface devices 38 are connected to one another for data communication purposes by means of train buses 40, 42, 44 which extend along the entire consist and are described in more detail further below.

Figure 3:
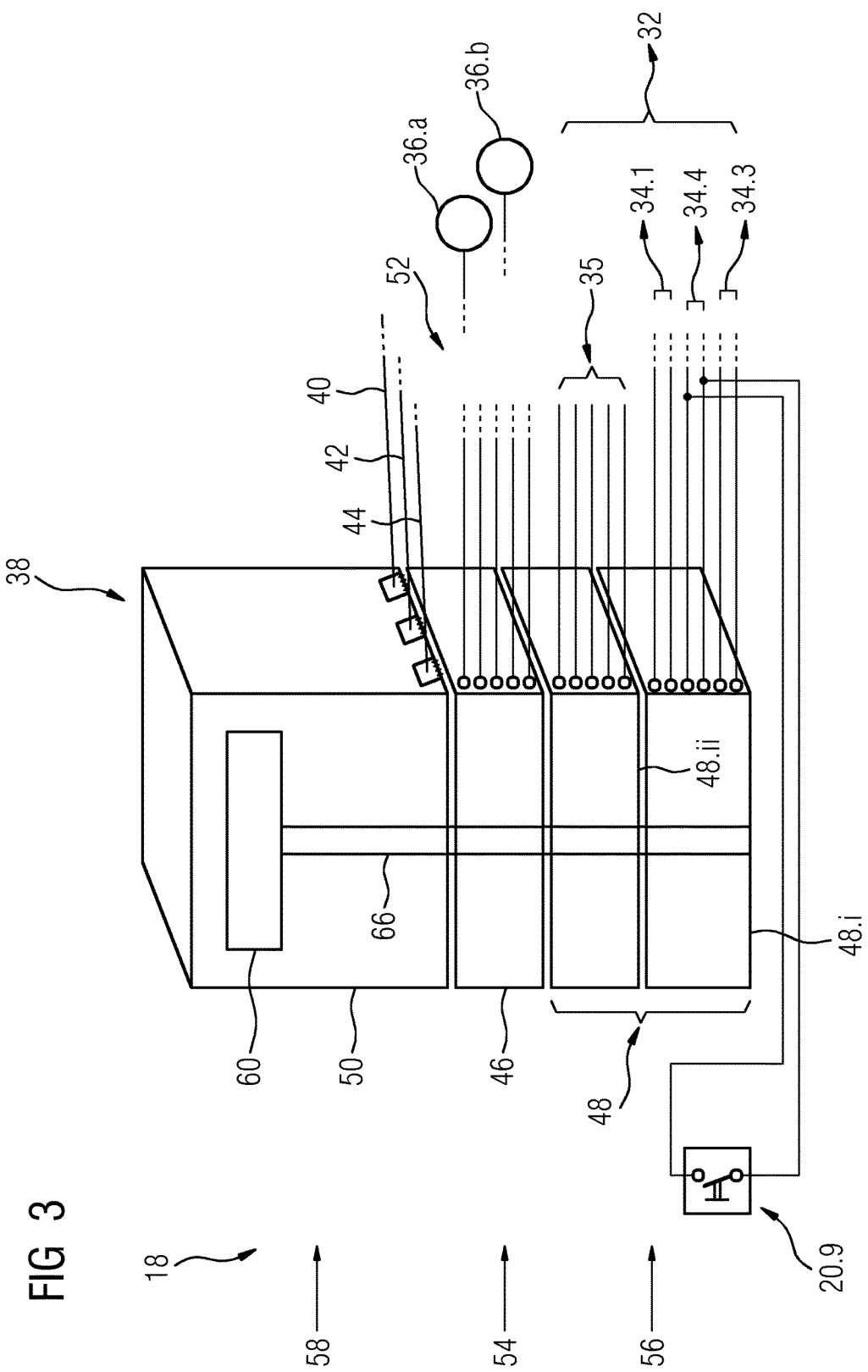
FIG. 3: shows one of the guide system interface devices from FIG. 2 in a detail view.

FIG. 3 shows the guide system interface device 38.1 of the vehicle unit 12.1 in a detail view. The following explanations also apply to the further guide system interface devices 38.2 to 38.6 in the further vehicle units 12.2 to 12.6.

Said guide system interface device comprises a first interface unit 46, to which lines of a digital data bus structure 52 of the corresponding vehicle unit 12 are connected. Conventional control and communication data bus structures may be used for this purpose, such as e.g. a bus structure based on Ethernet technology. In particular, a bus of the "Profinet®" type may be used as part of the bus structure, in which case the bus topology may have a Profinet ring, for example. However, other structures, such as e.g. a CAN structure, are conceivable. The data bus structure 52 and subsystems 36 connected thereto are represented schematically in FIG. 3.

The guide system interface device 38 additionally has a second interface unit 48, to which the lines 34 of the line set 32 are connected. In particular, the lines 34.1 of the door loop, the lines 34.2 of the dead man's vigilance device (not shown), the lines 34.3 of the emergency brake loop and the lines 34.4 of the emergency brake override loop are attached to connection means of the interface unit 48. The operating means 20.9 embodied as an actuating unit, in particular in the form of a pushbutton switch, is furthermore shown explicitly by way of example. The lines 34.4 of the emergency brake override loop, to which the operating means 20.9 is connected, are likewise shown.

The interfaces for the lines 34 are formed by a first unit 48.i of the interface unit 48. A further unit 46.ii of the first interface unit 48 forms connection options for electrical lines 35 of the line set 32, which are assigned to the performance of other analog processes that are different from the monitoring of a safety loop. The electrical lines 35 may correspond to local control lines of the corresponding vehicle unit 12.

The guide system interface device 38 additionally has a third interface unit 50, to which the train buses 40, 42, 44 are connected. The function and embodiment of the train buses are described in more detail further below.

The interface units 46, 48, 50 are each assigned to a different guide system level of the guide system 18. In a first guide system level 54, subsystems 36 are networked with one another by means of the digital data bus structure 52, wherein the interface unit of the guide system interface device 38 assigned to the first guide system level 54 corresponds to the first interface unit 46. In a second guide system level 56, operating means 20 in subsystems 36 are interconnected by means of the line set 32 for the purpose of the analog handling of processes. The corresponding interface unit of the guide system interface device 38 is formed by the second interface unit 48. The first and second guide system levels 54, 56 can be distinguished from one another in particular by the type of signals that are handled by them. The first guide system level 54 is assigned to the handling of digital signals, whereas the second guide system level 56 is assigned to the handling of analog signals. The first interface unit 46 is in this case embodied as an input/output unit (or I/O unit) for digital signals and has interfaces that are embodied for connecting cables for digital data transmission. The second interface unit 48 is embodied as an input/output unit for analog signals and has interfaces that are embodied for connecting analog electrical lines for conducting analog signals.

The guide system 18 has a third guide system level 58 which is formed by the train buses 40, 42, 44 connecting the vehicle units 12. The interface unit 50, which forms connection options for the train buses, belongs to the third guide system level 58.

The guide system interface device 38 additionally comprises a control unit 60, which is provided for handling operating processes on the basis of signals that are received or sent by way of the interface units 46, 48, 50. The control unit 60 is represented schematically in FIG. 3 and shown in a detail view in FIG. 4.

The control unit 60 has a computing unit 62 which is equipped with two processor units 62.1, 62.2. The implementation with two processor units enables control processes of the control unit 60 to be embodied redundantly. In particular, a diverse redundancy can be achieved by programming a control process with different algorithms that are executed by the different processor units 62.1, 62.2. The processor units 62.1, 62.2 may be formed by two processors (or CPUs) that are physically different from one another or they may be formed by one processor, in which case the processor units 62.1, 62.2 are formed on a logical level. The control unit 60 further comprises a memory unit 64, which is embodied as a ROM and/or RAM memory and in which software modules are stored for the purpose of executing control processes.

The guide system interface device 38 has an internal data bus 66, to which the control unit 60 and the interface units 46, 48, 50 are connected (see also FIG. 3). Data is transferred between the interfaces of the interface units 46, 48, 50 and the control unit 60 via the data bus 66. Data read out by the interface units is routed to the control unit 60 via the data bus 66, and data generated by the control unit 60 is conducted to the interface unit assigned to the data via the data bus 66.

The control unit 60 further comprises an evaluation unit 68 which is connected for data communication purposes to the computing unit 62 and is provided for evaluating safety-related signals that are read out by the interface units 46, 48. Accordingly, these are signals that are generated in the corresponding vehicle unit 12 in which the respective guide system interface device 38 is arranged. Said safety-related signals can be generated in the first guide system level 54 and received in digital form by the first interface unit 46 via the data bus structure 52. In addition, safety-related signals can be generated in the second guide system level 56 and captured as analog signals by the second interface unit 48. An example of a safety-related analog signal of said type is a voltage change in a safety loop formed by the lines 34.1, 34.2, 34.3 or 34.4. Alternatively or in addition to a voltage change, a signal having a specific frequency can be captured by the interface unit 48. Considered more generally, at least one change in at least one signal or line characteristic (voltage value, current value, frequency, resistance, conductivity, etc.) is sensed by the second interface unit 48 and—by being conducted by means of the internal bus 66—is evaluated by the evaluation unit 68.

A change to a signal or line characteristic is triggered e.g. by the actuation of an operating means 20.11 by a passenger (emergency brake loop), by an actuation of an operating means 20.3 during a closing process (door loop), in a lead unit 12.1 or 12.6 by an actuation of the operating means 20.7 (dead man's loop) or in a lead unit 12.1 or 12.6 by an actuation of the operating means 20.9 (emergency brake override loop). These signals are captured and evaluated by the evaluation unit 68. Evaluation results are forwarded to the computing unit 62, which executes a corresponding control process. In the examples of the emergency brake loop and the dead man's loop, the triggered control process may be the initiation of an emergency braking action. In the example of the emergency brake override loop, upon the actuation of the operating means 20.9 being detected by the evaluation unit 68, said initiation of an emergency braking action may be overruled, at least temporarily, by the computing unit 62.

With regard to said safety-related analog signals, one task of the control unit 60—in addition to the detecting of a change in a signal or line characteristic by way of the second interface unit 48—is to initiate the injection of the line set 32 with suitable analog signals, such as in particular the injection of a constant direct-current voltage or an alternating-current voltage having a specific frequency. To put it another way, the operation of the second interface unit 48 as an analog input/output unit in at least one operating mode of the control unit 60 is controlled by the latter so that processes carried out by way of said second interface unit 48, in particular the injection and the readout of analog signals into and out of the line set 32, are handled by said control unit 60.

In particular the control unit 60 and the line set 32 form the above-described safety loops, the line set 32 and the second interface unit 48, in particular the unit 48.i, forming the physical structure of a loop, while the control unit 60 replaces the signal evaluation of the loop traditionally provided by conventional switching circuitry—in particular by means of switches, relays, comparators, AND gates, OR gates, timers, etc.—on a logical level.

With regard to the above-described "dead man's loop", the control unit 60 may be programmed with an operating mode in which it fulfills the function of the juristical recording device.

In addition to the aforementioned door or door control loop and brake or brake command loop, a door locking loop, a direction-of-travel determination loop, and/or a coupling loop may be formed by the control unit 60 together with electrical lines of the line set 32.

The control unit 60 can furthermore monitor lines 34, 35 of the line set 32 in a monitoring mode by way of the second interface unit 48. In particular a line break in the line set 32 can be detected by the control unit 60 by the sensing of a resistance characteristic or a conductivity characteristic.

Figure 4:
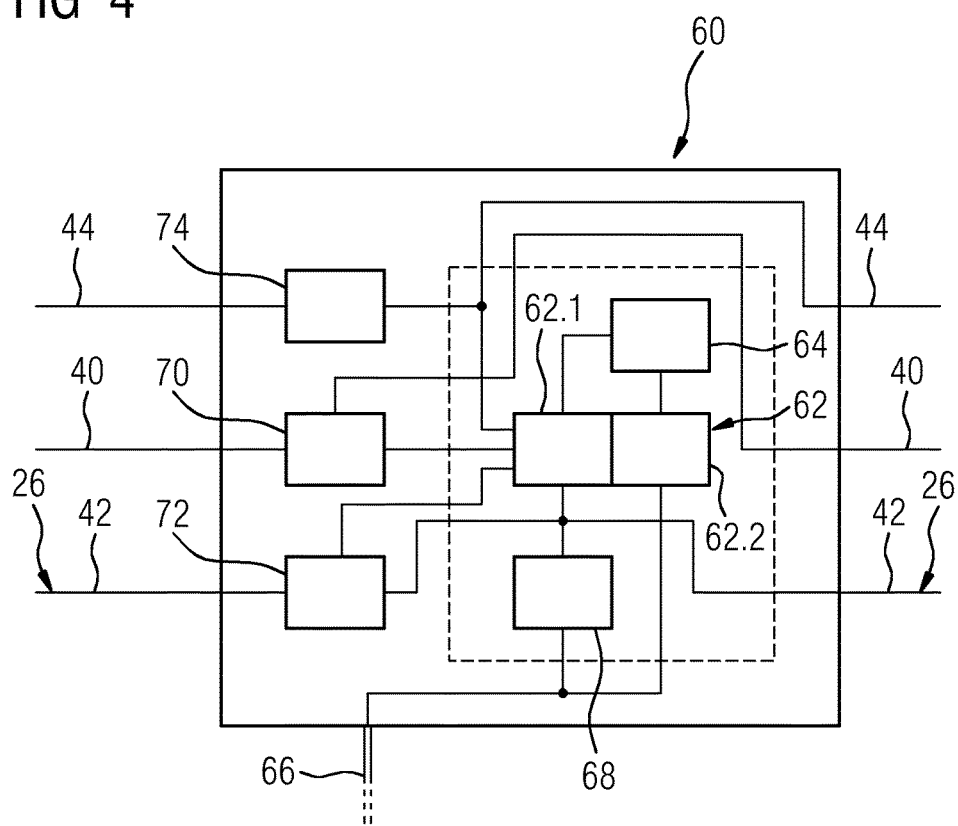
FIG. 4: shows a control unit of the guide system interface device from FIG. 3, FIG. 5: shows a meshed network formed by the train buses and the guide system interface devices.
Figure 5:
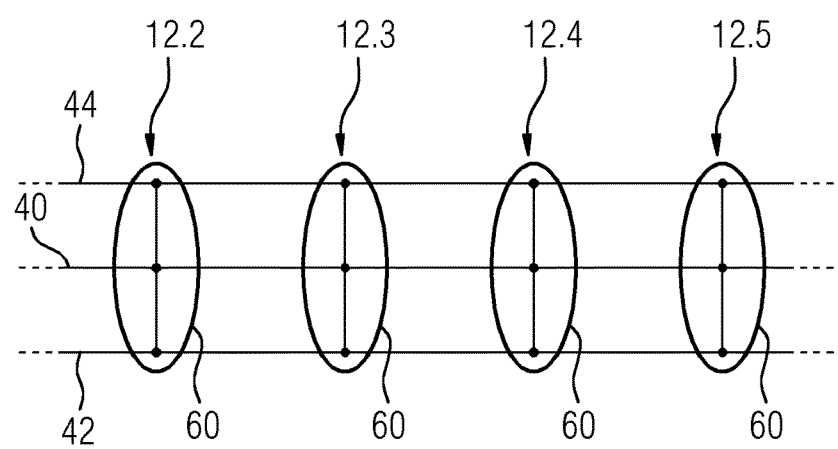

As already mentioned above, the third guide system level 58 has three train buses 40, 42, 44 which extend along the entire consist of vehicle units 12 (see FIG. 2). Each vehicle unit 12 is connected to the train buses 40, 42, 44 at a coupling point. Said coupling point is formed in the vehicle units 12 in each case by means of the associated guide system interface device 38. To that end, said device is provided, as described above, with the interface unit 50, to which the train buses 40, 42, 44 are connected (see FIG. 3). The connection of said train buses to the control unit 60 is shown in FIG. 4. Said control unit has a set of three communication processors 70, 72, 74, each of which is assigned to a different train bus 40, 42 and 44, respectively. Said communication processors 70, 72, 74 are connected in the data flow of the respective assigned train bus and are connected for data communication purposes to the computing unit 62. Said connections enable data routed via the train buses 40, 42, 44 and the corresponding interface of the interface unit 50 to be received and evaluated by the computing unit 62. Data generated by the computing unit 62 in a control process of the control unit 60 can also be coupled into the corresponding train buses via said connections.

Each of the train buses 40, 44 is embodied as an Ethernet bus. The train bus 40 is embodied as a convenience bus which is provided at least for the purpose of transmitting information for the passengers. This information may correspond to useful information, such as e.g. information concerning an operating procedure, or entertainment information, such as in particular audio and video data. The train bus 40 is in this case configured for a transfer rate of at least 100 MB/s.

The train buses 40, 44 differ from one another in respect of their basic function by virtue of the respective safety level that is assigned to them. A data communication taking place over the train bus 40 is subject to general data security requirements, which are specified in the Federal Republic of Germany in particular by the Federal Office for Information Security (BSI). The safety level assigned to the train bus 44, in contrast, is higher and corresponds to requirements pertaining to personal safety. Such requirements are also referred to by experts in the field as "safety requirements". The train bus 44 is embodied for example as an ETB bus (or "Ethernet Train Bus") in accordance with a TCN standard. In particular data for a driving and/or braking operation is transmitted via the train bus 44.

Referring to the above-described example of the emergency brake loop, after the actuation of an operating means 20.11 of the corresponding vehicle unit 12 has been detected by the evaluation unit 68, the computing unit 62 generates data by means of which an emergency braking action can be triggered by the braking device 19. This data is transmitted over the train bus 44 to further units in other vehicle units 12 of the rail vehicle 10. The train bus 44 may therefore be considered as a train operation bus serving at least for the transmission of driving or braking data.

The third train bus 42 is formed by lines 26 of the electrical supply system 24 (see also FIG. 1). The communication processor 72 is provided with a coupling-in and decoupling unit by means of which a digital signal generated by the computing unit 62 can be coupled in analog form into a line 26 of the electrical supply system 24 and an analog signal conducted over the line 26 can be decoupled by the same and passed in digital form to the computing unit 62. To that end, the coupling-in and decoupling unit is embodied for performing a modulation and demodulation method, respectively. This method may be in particular an orthogonal (de)modulation method. The primary function of the third train bus 42 is to provide at least one redundant communication channel in the third guide system level 58.

As described above, each of the train buses 40, 42, 44 has a basic function which is related in particular to the respectively assigned safety level and in particular to the type of data that is to be transmitted. It is, however, conceivable that in one operating mode the control units 60 in the vehicle units 12 are in each case provided for the purpose of determining and performing a distribution of data traffic onto the train buses 40, 42, 44. Thus, data that is received by a control unit 60 in a vehicle unit 12 via one of the train buses is forwarded by said control unit 60 into another train bus. The data network formed by the train buses 40, 42, 44 and by the control units 60 of the guide system interface device 38 can be operated as a meshed network in which the control units 60 form three network nodes in each case. This is shown in highly schematic form in FIG. 5, where transverse transitions between the train buses are also formed by means of the control units 60 in addition to the train buses 40, 42, 44.

FIG. 6 shows the vehicle unit 12.1 embodied as a lead car. The energy supply 28 of the electrical supply system 24 is arranged in said car (see also FIG. 1). The outgoing electrical lines 26 exiting therefrom are used as transmission lines of the train bus 42. To that end, one electrical line 26 is connected for data communication purposes to the guide system interface device 38.1 assigned to said vehicle unit 12.1 to serve as a data link. The train buses 40 and 44 are likewise connected to said guide system interface device. In addition, operating means 20 of the vehicle unit 12.1 are shown by means of which safety-related analog signals are generated which are received by the interface unit 48 and evaluated by the evaluation unit 68 of the control unit 60. Said operating means 20 are embodied in particular as actuating elements which are connected into the circuit in one or more of the above-described safety loops. In contrast to existing prior art solutions, lines of said safety loops are not connected directly to corresponding lines of the adjacent vehicle unit 12.2, but instead a data link—including to support a data communication in respect of the safety loops—to said vehicle unit as well as to all further vehicle units 12 is implemented exclusively by way of the local guide system interface device 38.1 and the set of train buses 40, 42, 44. A connection of the adjacent vehicle units 12.1 and 12.2 to one another for data communication purposes can accordingly be realized solely by way of the available train buses 40, 44 and via the electrical lines 26 which form the third train bus 42.

The invention claimed is:

1. A rail vehicle, comprising:
a vehicle unit having operating device subsystems; and
a guide system including a first guide system level in which said operating device subsystems are networked with one another by a digital data bus structure, and at least one second guide system level having at least one line set associated with an analog handling of processes in said operating device subsystems;
said vehicle unit having a guide system interface device with a first interface unit associated with said data bus structure, at least one second interface unit associated with said line set, and a control unit having at least one operating mode provided for handling the processes by way of said second interface unit.

2. The rail vehicle according to claim 1, wherein said control unit and said line set form at least one at least partially logical safety loop.

3. The rail vehicle according to claim 2, wherein said at least one at least partially logical safety loop formed by said control unit and said line set is at least one of a door control loop, a door locking loop, an emergency brake loop, a brake command loop, a direction-of-travel determination loop or a coupling loop.

4. The rail vehicle according to claim 1, wherein said guide system interface device has at least one third interface unit to be connected to at least two train buses.

5. The rail vehicle according to claim 4, wherein said guide system interface device has at least one internal data bus to which said control unit and said interface units are connected.

6. The rail vehicle according to claim 4, wherein at least one of said train buses is an Ethernet train bus.

7. The rail vehicle according to claim 4, which further comprises an electrical power supply system having lines, one of said train buses being formed by said lines of said power supply system.

8. The rail vehicle according to claim 7, wherein said control units in said guide system interface devices have an operating mode for determining and performing a distribution of data traffic to said train buses.

9. The rail vehicle according to claim 4, wherein said third guide system level has at least three train buses, each of said at least three train buses connects said vehicle units to one another, and said third interface unit is provided to be connected to said at least three train buses.

10. The rail vehicle according to claim 4, wherein said train buses (40, 42) are each associated with a different safety level.

11. The rail vehicle according to claim 10, wherein one of said train buses is a convenience bus configured at least for transmitting information for passengers.

12. A rail vehicle, comprising:
a consist of vehicle units, each of said vehicle units having operating device subsystems; and
a guide system including a first guide system level in which said operating device subsystems are networked with one another by a digital data bus structure, at least one second guide system level with at least one line set associated with an analog handling of processes in said operating device subsystems, and a third guide system level with at least two train buses connecting said vehicle units to one another;
said guide system including a set of guide system interface devices each being disposed in a different one of said vehicle units and having a first interface unit associated with said data bus structure, a second interface unit associated with said line set, at least one third interface unit for said train buses, and a control unit having at least one operating mode for handling said processes by way of said second interface unit.

13. The rail vehicle according to claim 12, wherein said control unit and said line set form at least one at least partially logical safety loop.

14. The rail vehicle according to claim 13, wherein said at least one at least partially logical safety loop formed by said control unit and said line set is at least one of a door control loop, a door locking loop, an emergency brake loop, a brake command loop, a direction-of-travel determination loop or a coupling loop.

15. The rail vehicle according to claim 12, wherein each of said guide system interface devices has at least one internal data bus to which said control unit and said interface units are connected.

16. The rail vehicle according to claim 12, wherein at least one of said train buses is an Ethernet train bus.

17. The rail vehicle according to claim 12, which further comprises an electrical power supply system having lines, one of said train buses being formed by said lines of said power supply system.

18. The rail vehicle according to claim 12, which further comprises a third guide system level having at least three train buses, each of said at least three train buses connecting said vehicle units to one another, and said third interface unit being configured to be connected to said at least three train buses.

19. The rail vehicle according to claim 12, wherein said train buses (40, 42) are each associated with a different safety level.

20. The rail vehicle according to claim 19, wherein one of said train buses is a convenience bus configured at least for transmitting information for passengers.

* * * * *